United States Patent [19]
Tozawa et al.

[11] Patent Number: 5,420,978
[45] Date of Patent: May 30, 1995

[54] METHOD AND APPARATUS FOR CUSTOMIZING A SCHEDULE DISPLAY

[75] Inventors: Yoshio Tozawa, Tokyo; Shinji Yokoi, Urayasu, both of Japan

[73] Assignee: International Business Machines Corporation, Armonk, N.Y.

[21] Appl. No.: 6,342

[22] Filed: Jan. 19, 1993

[30] Foreign Application Priority Data

Jan. 20, 1992 [JP] Japan .................................. 4-007430

[51] Int. Cl.⁶ .......................... G06F 3/14; G06F 17/60
[52] U.S. Cl. ..................................... 395/161; 395/155; 364/188; 364/401
[58] Field of Search ................ 375/155, 161, 140, 160; 364/188, 144, 145, 146, 401, 402, 569

[56] References Cited

U.S. PATENT DOCUMENTS

| | | | |
|---|---|---|---|
| 4,937,743 | 6/1990 | Rassman et al. | 364/401 |
| 4,954,981 | 9/1990 | Dehner, Jr. et al. | 395/140 |
| 5,148,154 | 9/1992 | Mackay et al. | 395/155 X |
| 5,168,554 | 12/1992 | Luke | 395/161 |
| 5,261,045 | 11/1993 | Scully et al. | 395/161 |
| 5,323,314 | 6/1994 | Baber et al. | 364/401 |

*Primary Examiner*—Raymond J. Bayerl
*Attorney, Agent, or Firm*—Jonathan E. Jobe; Duke W. Yee; Andrew J. Dillon

[57] ABSTRACT

This invention enables users to interactively modify a schedule display in sequence in building or after completing a scheduling system in adaptation to the service environment, utility, and purpose of the system.

The class layer structure modifier is used to modify the way to group data objects. Then the information stored in the attribute definition storage device and the graphic object definition storage device is modified to correct display attributes and their ways of display in order to enable schedules to be displayed in a format suitable to a user's view.

16 Claims, 14 Drawing Sheets

```
draw_line(start_time, y_act, end_time, y_act);
draw_str(start_time, y_act, product_name);
```

```
"draw_line(st100, y_act, et100, y_act);"
"draw_line(st100, y_act, st100, y_act+6);"
"draw_str(st100, y_act+2, resrc_id);"
"draw_str(st100+20, y_act-10, model);"
"if(@specified(@vbf))
   cdraw_line(st100, y_act, @vbf.et100, @vbf.y_act, CLR_GREEN);"
"if(@not(cresrc=" ")) draw_str(et100+5, y_act, cresrc);"
```

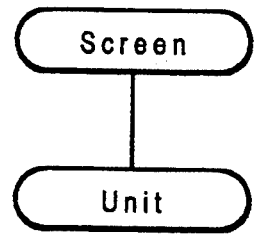
Fig. 15
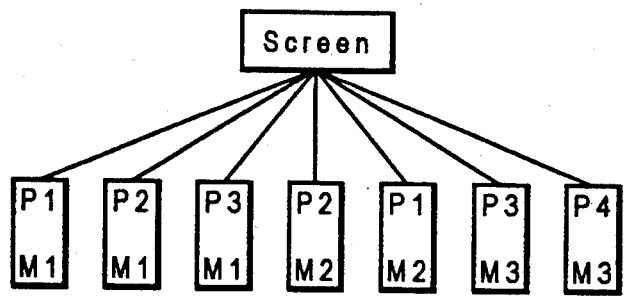
Fig. 16
Fig. 17

METHOD AND APPARATUS FOR CUSTOMIZING A SCHEDULE DISPLAY

TECHNICAL FIELD OF THE INVENTION

This invention relates to scheduling systems that manage manufacturing process schedules, and more particularly to a scheduling system that enables users to interactively customize a schedule display.

BACKGROUND OF THE INVENTION

A schedule display is a graphic representation on a screen of a collection of schedule data. The schedule data has a process start time, a process end time, a process machine, and other attribute values and it is referred to as a "unit". The specific way to make graphic representations depends on environments, usage, and each user's interest involved. In order to obtain a new display according to such dependency, an existing display program is sequentially modified to create a new display program while viewing the result of each modification. Customization of a display means such modification.

Factors affecting the way in which to make graphic representations are largely divided into two types: those which are associated with each user's view, which are usually determined by each user's interest, and those which are related to detailed graphic object definitions of graphic primitives. In the prior art, there is no available function which enables to modify a schedule display according to the former factors, or in response to a change in a user's view. In order to modify a display on account of the latter factors, on the other hand, some graphic routines of the GKS (Graphical Kernel System (GKS) International Standard (ISO 7942)) and the like are used for programming. This method has been problematic in that it is necessary to locate a part to be modified by checking through a source program inasmuch as it is impossible to find out in advance a suitable program corresponding to a particular graphic representation to be modified. It is none the less impracticable for a user to take the trouble to do so. This method has been problematic also in that a modification in a source program would entail such operations as compilation, which makes it impossible to make any such modification in interactive mode.

The prior patent publications, including JPUPA (Japanese Published Unexamined Patent Application) 61-23003 and PUPA 63-263566 containing references to the prior art pertaining to the preparation and display of schedules with the aid of computers or the like, contain no reference to the modification of a display of schedules according to a view.

SUMMARY OF THE INVENTION

The following points are characteristic of displays of schedules:
  The horizontal axis represents time.
  The way to group and two-dimensionally lay out schedule data (units) depends on each user's interest.
  Data is grouped hierarchically.

This invention has been produced taking the above-mentioned circumstances into consideration, and is designed to enable users to interactively modify displays of schedules in sequence in creating a scheduling system or after completing a scheduling system in adaptation to changes in the service environment, utility, purposes, etc. of the system on the basis of the aforementioned knowledge concerning the features of a schedule display.

In order to achieve the above-mentioned purpose, this invention provides means to enable the rearrangement and uniform handling of seemingly multiform displays of schedules by controlling the two aspects, i.e., how to group data and how to display such grouped data, and thus to enable customization among multiform displays of schedules.

As has been explained so far, this invention enables users to modify interactively a schedule display in sequence in building or after completing a scheduling system in adaptation to the service environment, utility and purpose of the system through providing the means to control the two aspects, that is, how to group data and how to display such grouped data.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

FIG. 15 shows a drawing of the class layer structure where the processing machine is deleted from a user's view in FIG. 13;

FIG. 16 shows a drawing of the structure of data objects where the processing machine is deleted from FIG. 14;

FIG. 17 shows a drawing of a schedule display classified by product name;

DETAILED DESCRIPTION OF THE INVENTION

In the course of examining the multiformity of a schedule display paying attention to users' interest, the inventors have gained the knowledge that there are some notable features in the schedule display.

Figure 1:
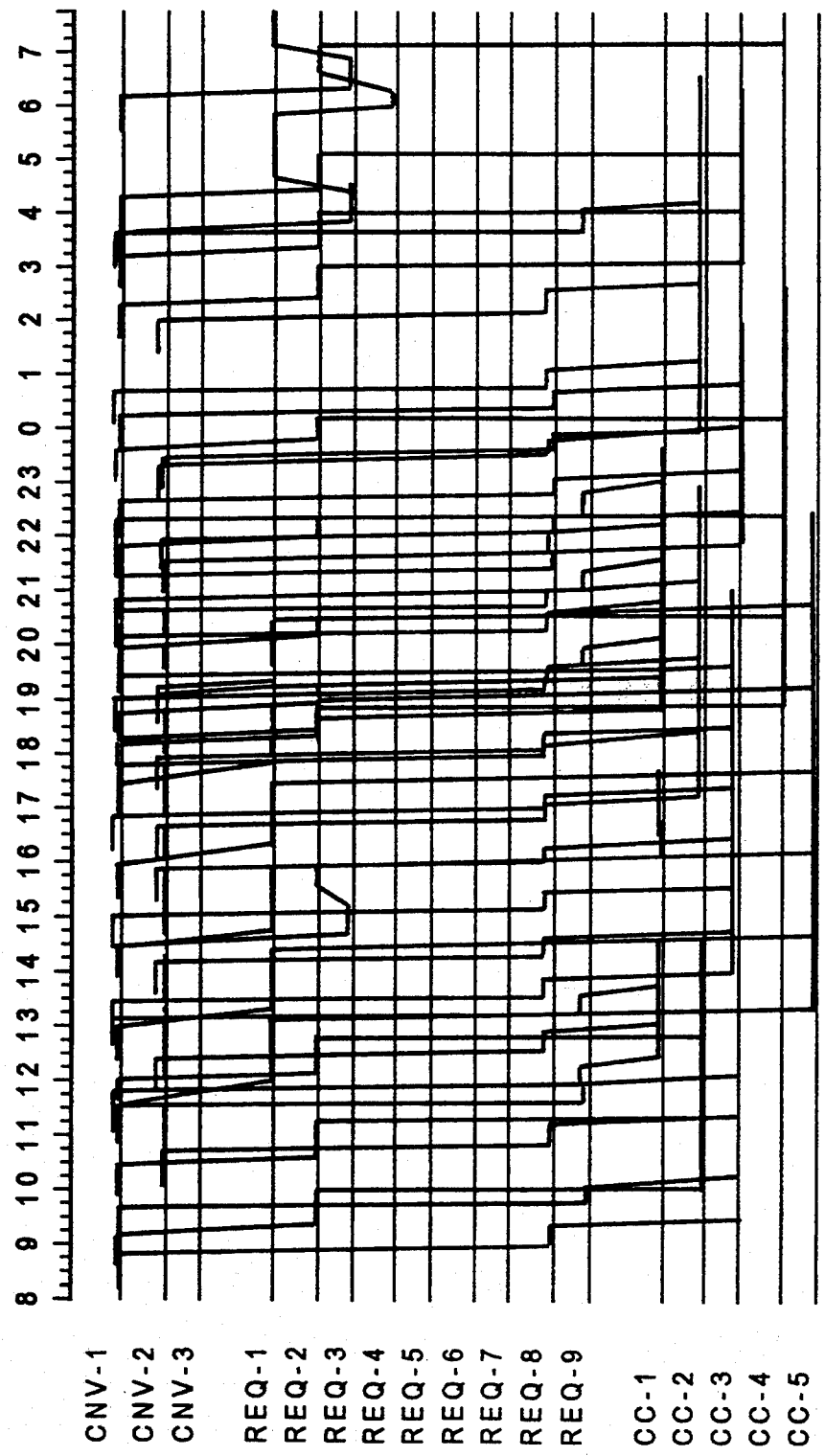
FIG. 1 shows a drawing of a schedule display.

FIG. 1 shows an example of a display of a steel making process schedule, where the horizontal axis represents the lapse of time and the character strings on the left side denote steel making machine names. In this example, the types of steel making machines and their display positions on the screen are fixed. The thick horizontal lines each represent a steel making process unit. Since in this example, users' interest is directed toward following the flow of a series of steel making processes, the successive units along the processes are joined by vertical lines. These successive units represent the same product and are hence grouped together under the name of a task from the viewpoint of internal data structure. Inasmuch as each task represents the same product, a product number is marked at the upper part of the leading unit representative of each task.

Moreover, each task is grouped into units to be processed continuously by a series of casting machines (CC-1, ..., CC-5) under the name of lots, which correspond to steel refinery process subschedules.

Figure 2:
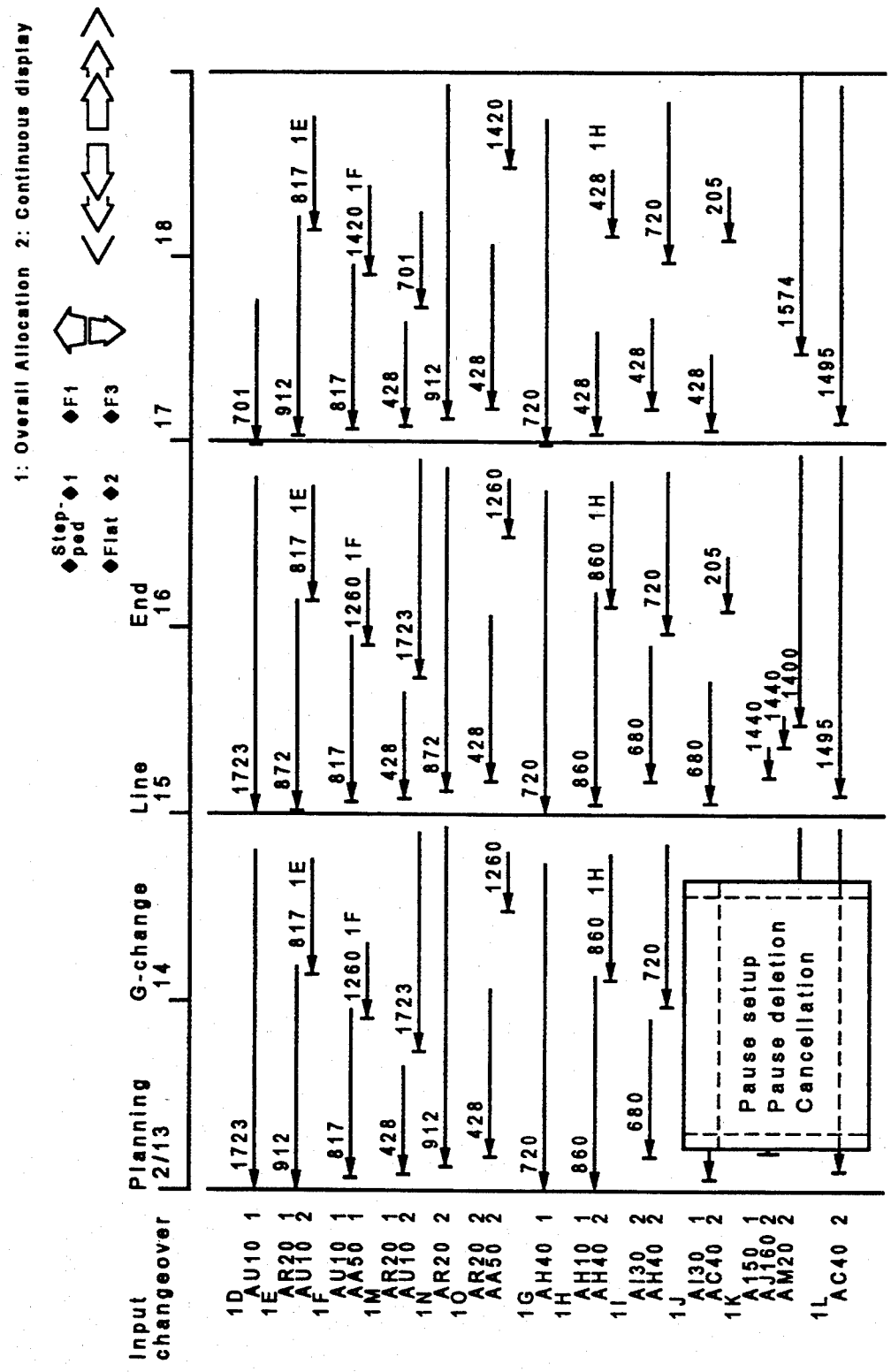
FIG. 2 shows a drawing of a schedule display.

FIG. 2 shows an example of a schedule display for the assembly process of electronic boards. The horizontal axis represents time (dates). The character strings (1D, 1E, etc) on the vertical axis denote processing machine names, and the four-character strings at their lower right denote the names of electronic boards to be processed. In this example, the processing machine names and electronic board names are variable with schedule data to be displayed. The line segments extending in the horizontal axial direction represent assembly process units. The numbers above the units denote lot sizes. Inasmuch as in this example users' interest is directed toward processes by processing machine and electronic board, the units representing those processes are grouped according to processing machine and electronic board under the name of processing machines and models from the viewpoint of internal data structure.

As can be seen from the examples cited above, the following points are characteristic of displays of schedules:

The horizontal axis represents time.

The way to group and two-dimensionally lay out schedule data (units) depends on each user's interest.

Data is grouped hierarchically.

This invention has been produced taking the above-mentioned circumstances into consideration, and is designed to enable users to interactively modify displays of schedules in sequence in creating a scheduling system or after completing a scheduling system in adaptation to changes in the service environment, utility, purposes, etc. of the system on the basis of the aforementioned knowledge concerning the features of a schedule display.

In order to achieve the above-mentioned purpose, this invention provides means to enable the rearrangement and uniform handling of seemingly multiform displays of schedules by controlling the two aspects, i.e., how to group data and how to display such grouped data, and thus to enable customization among multiform displays of schedules.

The following explains an embodiment of this invention in reference to the relevant drawings. The following explanation deals only with a display customizing apparatus for displaying schedules for which schedule data is received from the scheduling system main unit involved, or the schedule generating unit involved. Any conventional techniques may be applied for the generation of schedules.

(1) EXPLANATION OF TECHNICAL TERMS AND CONCEPTS

A brief explanation of some technical terms and concepts is first of all given below.

Graphic Object

The unitary graphics (line segments, character strings, numerals, etc.) which forms a schedule displayed on a screen are called graphic objects. Each graphic object is assigned a graphic object identification number to enable its individual identification.

Data Object

The display customizing apparatus drawn here as an embodiment of this invention itself retains data corresponding to the schedule data which the scheduling system main unit (the schedule generating section) retains, in order to display the schedule data in tune with each user's view. Such data retained for its own sake is called a data object.

View and Class

In this invention, a user's outlook on schedule data is called a user's view. A view constitutes a layer of a class, which is itself the generic name for sets of data obtained when data objects are classified (grouped) according to a user's view. The concept "class" will be detailed later.

Parentage and Grouping

In this invention, the concept "data object parentage" is used to express a way to group schedule data which is dependent on each user's view. Data objects handled as a group according to a user's view establish parentage with a common parent. That is, data objects of the same parentage are handled as a single group. As to the display of schedule grouping by machine name in FIG. 4, for example, unit data objects p1, p2, and p3 come into parentage with their common data object, Machine 1. The operation required to bring data objects into parentage is called "grouping".

Class

A class is a description of a method of displaying data object attributes and data objects (graphic object definitions) on a screen. Each data object is subsumed in one class. The relation between a data object and its subsuming class is described in terms of membership. Data objects subsumed in the same class have the same attributes and undergo the same treatment in being represented graphically.

Classes form a hierarchical structure, in which the highest class is "screen" and the lowest class is "unit". The intermediate classes each form a specific structure reflecting each user's grouping operation.

Schedule Data (Units) and Data Objects

In this invention, schedule data (units) is handled separately from data objects. Schedule data (units) refers to that which is handled in the main unit (the schedule generating section) of the scheduling system involved. The data is represented in a structure suited for schedule generation, namely, a schedule data structure. On the other hand, the display customizing apparatus presented in this embodiment has to represent a unique data structure such as parentage distinguished from the above-mentioned schedule data structure in order to make a schedule display customizable according to a user's view. In this invention, unique data objects are generated in correspondence to the schedule data in the main unit of the scheduling system involved and data is represented on those data objects in order to achieve this purpose.

(2) OUTLINE OF EMBODIMENT

Figure 3:
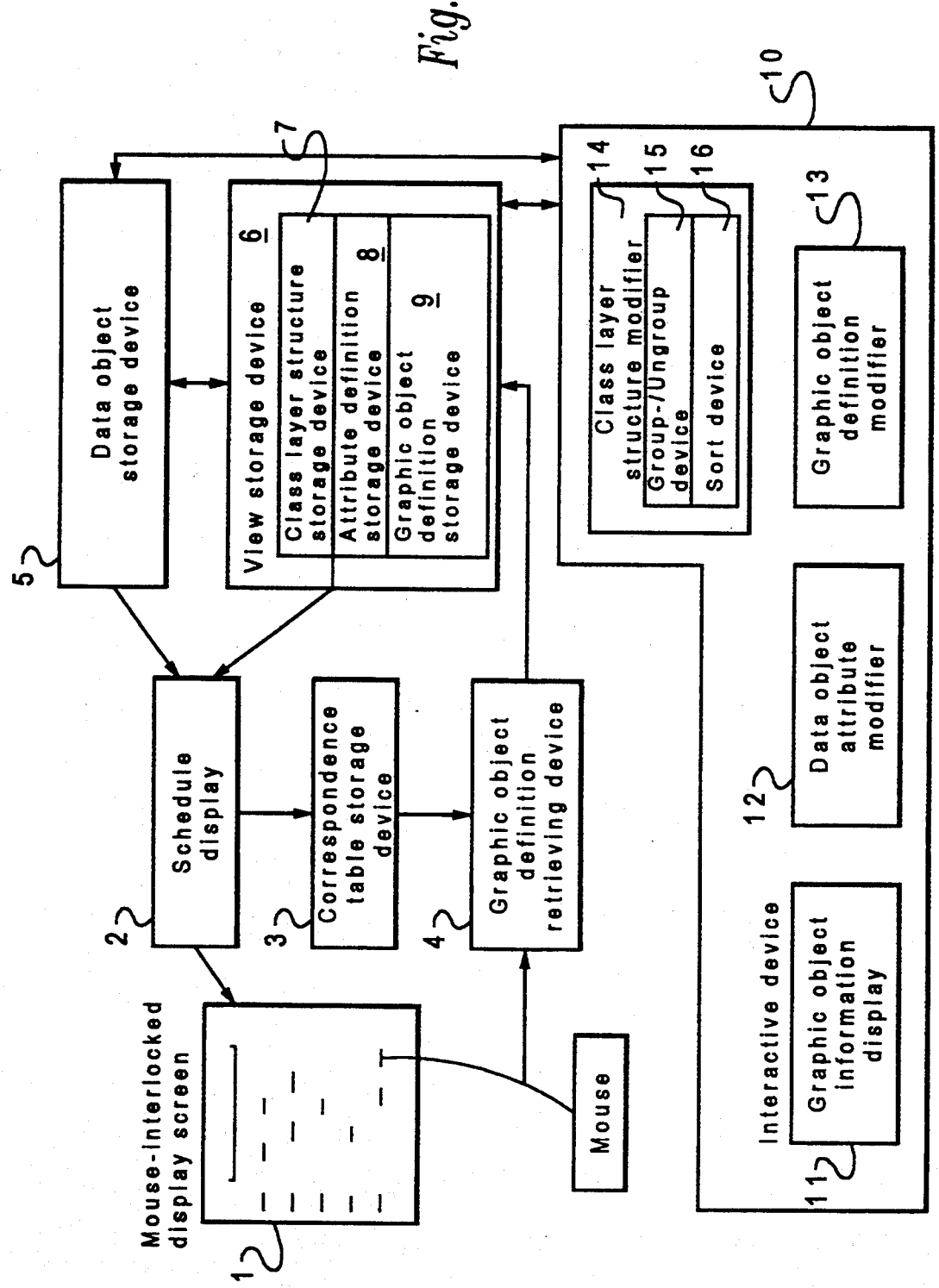
FIG. 3 shows a block diagram of an embodiment of this invention.

FIG. 3 shows the display customizing apparatus presented in this embodiment. In FIG. 3, the display customizing apparatus consists of a mouse-interlocked display screen 1, a schedule display 2, a correspondence table storage device 3, a graphic object definition retrieving device 4, a data object storage device 5, a view storage device 6 (a class layer structure storage device 7, an attribute definition storage device 8, a graphic object definition storage device 9), an interactive device 10 (a graphic object information display 11, a data object attribute modifier 12, a graphic object definition modifier 13, and a class layer modifier 14). The class layer modifier 14 consists of a group generating/deleting device 15 and a sorting device 16.

The schedule display 2 reads data objects from a hierarchical representation (hierarchy of grouping) of schedule data stored in the data object storage device 5, reads graphic object definitions (display specifications) described declaratively for each layer that are stored in the graphic object definition storage device 9 in the view storage device 6 and then reads data object attribute values from the data object storage device 5 through the attribute definition storage device 8.

The schedule display 2 produces a group of graphic objects for the display of schedule data from the data objects, graphic object definitions, and attribute values thus read, and transfers these graphic objects to the mouse-interlocked display screen 1 and displays those graphic objects on the mouse-interlocked display screen 1.

A table of correspondence between graphic objects and graphic object definitions is stored in the correspondence table storage device 3. When a graphic object on the screen is pointed to by means of the mouse of the mouse-interlocked display screen 1, the graphic object definition retrieving device 4 identifies its corresponding graphic object definition and displays the graphic object definition to the user through the graphic object information display 11 in the interactive device 10.

If a user's view is modified, it is necessary to modify the corresponding hierarchical representation of schedule data as well by use of the class layer structure modifier 14. The group generating/deleting device 15 modifies the corresponding hierarchical representation of schedule data in correspondence to the user's new view. Also, the sorting device 16 modifies the sequence of schedule data subsumed in each layer in accordance with the user's view. The operations required for a modification in a user's view will be detailed later in relation to the class layer structure modifier 14.

The interactive device 10 displays on a window graphic object information and a graphic object definition corresponding to the graphic object pointed to by means of the mouse. If a certain button for prompting the user to display other information is pressed on the window, a certain dedicated interactive window is opened to display a hierarchical representation of schedule data, a graphic object definition, and data object attributes, which are then modified in sequence in response to the user's operation.

(3) EXPLANATION OF EACH PART OF EMBODIMENT

(3-1) Data Storing Method

Data is stored in the data object storage device 5 and the view storage device 6 separately. The data object storage device 5 stores data-dependent parts varying with change in schedule data to be displayed. The view storage device 6, on the other hand, stores data-independent parts, i.e., users' views, which remain unchanged unless a user's view changes even if schedule data changes.

Data Object Storage Device 5

Figure 5:
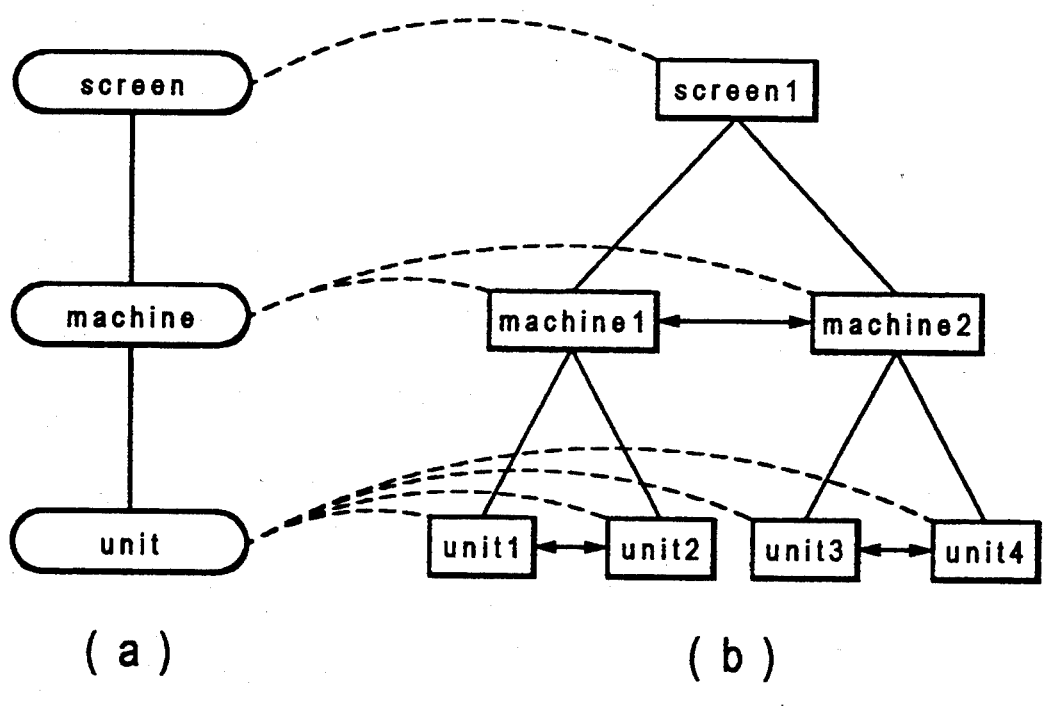
FIG. 5 shows a drawing of a data object structure corresponding to the display in FIG. 4.

The data object storage device 5 stores data objects generated independently in correspondence to the schedule data present in the main body of the scheduling system. The data object storage device 5 stores data objects in tree-structural representation of parentage, as shown in FIG. 5(b). In FIG. 5, each box represents a data objects, and the name of each box is a data object identifier. The solid lines drawn between data objects represent parentage links which indicate the parentage between these data objects.

View Storage Device 6

The view storage device 6 consists of a class layer structure storage device 7, an attribute definition storage device 8, and a graphic object definition storage device 9.

The class layer structure storage device 7 stores the hierarchical structure of classes (FIG. 5 (a)), which is generated by a user's grouping operations. The dotted lines drawn between the data objects and the classes in the class layer structure storage device 7 represent the subsumption relation between data objects and the classes in which those data objects are subsumed.

Figure 6:
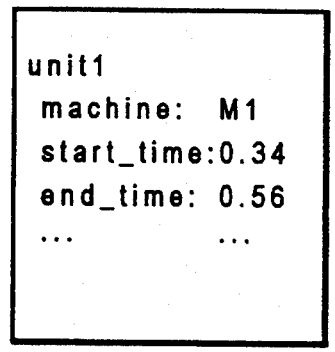
FIG. 6 shows a drawing of a data object structure corresponding to the display in FIG. 4.

The attribute definition storage device 8 stores the attributes of data objects subsumed in each class. That is, each data object has some attributes described in the class in which it is subsumed and stored in the attribute definition storage device 8. The attribute values of each data object are stored in the data object storage device. In FIG. 6, for example, data object unit 1 has some attributes such as "machine", "start_time", and "end_time", which are assigned attribute values such as M1, 0.34, and 0.56, respectively.

The graphic object definition storage device 9 stores graphic object definitions describing what kind of graphic representation should be made on the screen with regard to data objects subsumed in each class. When two or more graphic object definitions are described in a single class, serial numbers are assigned to those graphic object definitions by class.

Figures 4, 7, 8:
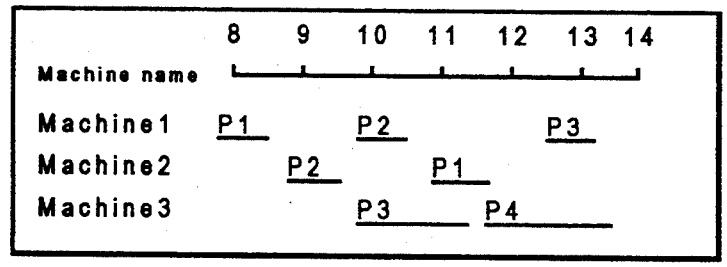
FIG. 4 shows a drawing of a classification of schedules by machine name.
FIG. 7 shows a drawing of a graphic object definition example in the unit class in FIG. 5.
FIG. 8 shows a drawing of a graphic object example described in the unit class.

Each graphic object definition is described in terms of a graphic primitive and its arguments. In the graphic object definition "draw_line (x1, y1, x2, y2);." for instance, the "draw_line" is a graphic primitive and x1, y1, x2, y2 are arguments. This definition is provided to draw a line segment from coordinates (x1, y1) to coordinates (x2, y2). The graphic object definitions shown in FIG. 7 are therefore provided to draw a line segment from the value of start_time to the values of end_time in the x-axial direction at height of y_act.

The current prototype system provides the following graphic primitives and their graphic representations, which can be increased if necessary:

| | |
|---|---|
| draw_line (x1,y1,x2,y2) | Draws a line segment from coordinates (x1, y1) to coordinates (x2,y2). |
| draw_string (x,y,str) | Draws a character string str at coordinates (x,y). |
| draw_char (x,y,char) | Draws a character char at coordinates (x,y). |
| draw_rum (x,y,num) | Draws a numeral num at coordinates (x,y). |

The graphic object definition descriptive language has the following syntax:

[logical expression] graphic-primitive, where the logical expression is a description of conditions for representing the graphic primitive graphically.

The square brackets ([ ]) denote that the corresponding enclosed entry may be omitted. The syntax of a logical expression is as follows:

logical expression: term logical-operator term terms:
    attribute-name|character-string|character|
    numeral|built-in-function|term.term logical operators: <1<=1>1>=1==1!=

FIG. 8 shows an example of a graphic object definition described in the unit class of an actual application.

(3-2) Behavior of Each Device

Behavior of schedule display 2:

The following describes the behavior of the schedule display 2 exhibited when a graphic object is displayed on the screen by entering a data object and a graphic object definition.

Step 1: Read one data object from the data object storage device 5 and store it temporarily.

Step 2: Read one graphic object definition from the graphic object definition storage device 9 and store it temporarily.

Step 3: Analyze the graphic object definition and read the attribute values referred to in the definition from the data object storage device 5 through the attribute definition storage device 8.

Step 4: Produce a graphic object instance from the data object, graphic object definition, and attribute values mentioned above.

Step 5: Produce a graphic object from the graphic object instance, and assign a unique graphic object identification number to the graphic object.

Step 6: Send the graphic object and graphic object identification number to the mouse-interlocked display screen 1. The mouse-interlocked display screen 1 displays the graphic object and stores the correspondence between displaying positions and graphic object identification numbers on the screen.

Step 7: Send the graphic object identification number, graphic object instance, and graphic object definition identifier (pointer) in a set to the correspondence table storage device 3. The correspondence table storage device 3 records this set of data.

Step 8: Repeat steps 2 to 7 with regard to all the graphic object definitions in the graphic object definition storage device 9.

Step 9: Repeat steps 1 to 8 with regard to all the data objects in the data object storage device 5.

Behavior of mouse-interlocked display screen 1:

The mouse-interlocked display screen 1 displays graphic objects and specifies a graphic form pointed to by means of the mouse. When the mouse-interlocked display screen 1 is provided with a graphic object and its corresponding graphic object identification number from the schedule display 2, the mouse-interlocked display screen 1 displays the graphic object and stores the correspondence between the displaying position of the graphic object and its related graphic object identification number. If a graphic form is pointed to by means of the mouse, a judgment is made as to which graphic object has been pointed to from the position of the mouse through retrieval of this correspondence and the corresponding graphic object identification number is returned.

Behavior of graphic object definition retrieving device 4:

Step 1: The mouse-interlocked display screen 1 detects a graphic object designated by a user on the screen by means of the mouse and returns its corresponding graphic object identification number.

Step 2: If the graphic object identification number is received, the graphic object definition retrieving device 9 retrieves the corresponding graphic object from the correspondence table storage device 3, and temporarily stores the corresponding graphic object instance and graphic object definition identifier.

Step 3: The graphic object information display 11 is activated to display graphic object information on the screen through the graphic object information display window. If, however, there is a session of the interactive device 10 already activated, information is displayed through the window of the session.

Behavior of graphic object information display 11:

Step 1: Read a graphic object instance and a graphic object definition identifier from the graphic object definition retrieving device 4.

Step 2: Read a graphic object definition from the graphic object definition storage device 9 according to the graphic object definition identifier.

Figure 9:
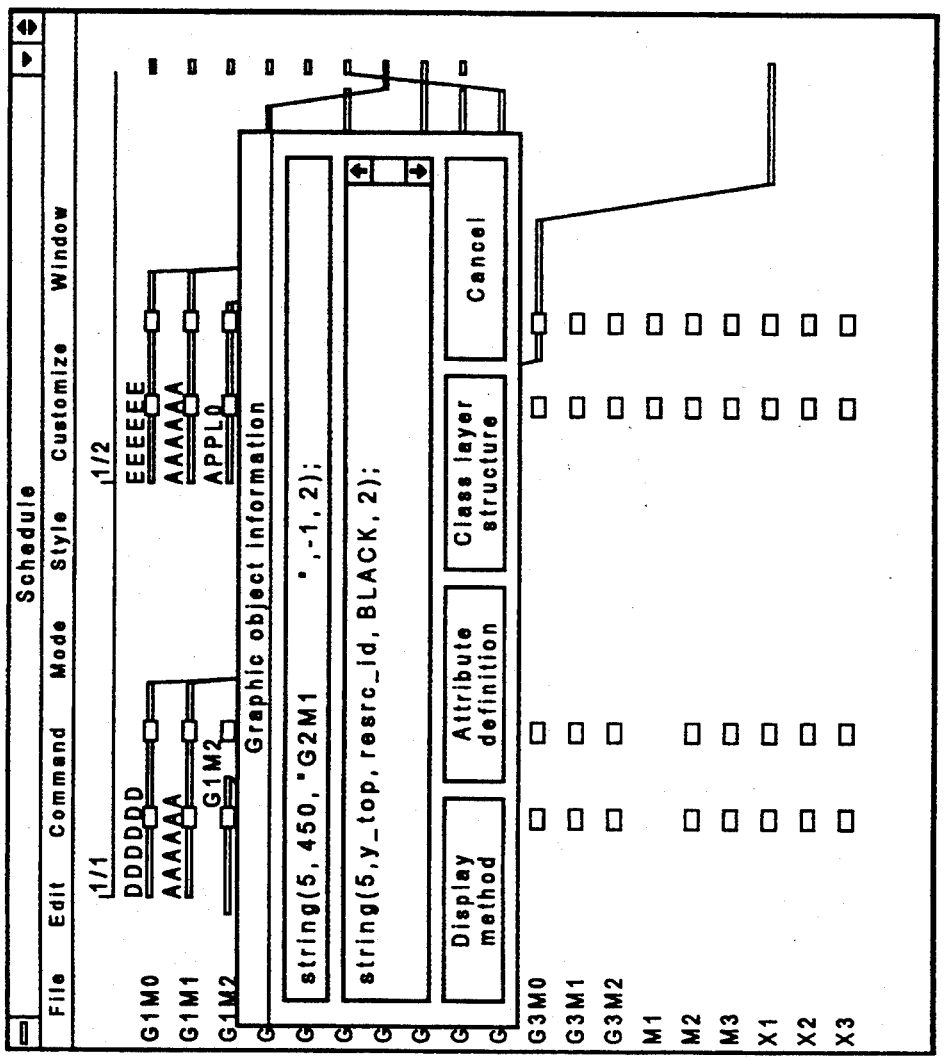
FIG. 9 shows a drawing of a screen example of the graphic object information display window.

Step 3: Display the graphic object instance and graphic object definitions read at steps 1 and 2 on the graphic object information display window. (Screen example 1 in FIG. 9)

Step 4: Transfers control to a corresponding session of the interactive device 10 when an interactive device activation button, e.g., "display methods", "attribute definition", "class layer structure", or "cancel", is pressed by a user on the window on display.

Behavior of data object attribute modifier 12

Step 1: The data object attribute modifier 12 reads one attribute definition from the attribute definition storage device 8 in the view storage device 6, and temporarily stores the class name, attribute names, attribute type, attribute value type, and attribute value calculating method by which this definition is described.

Figure 10:
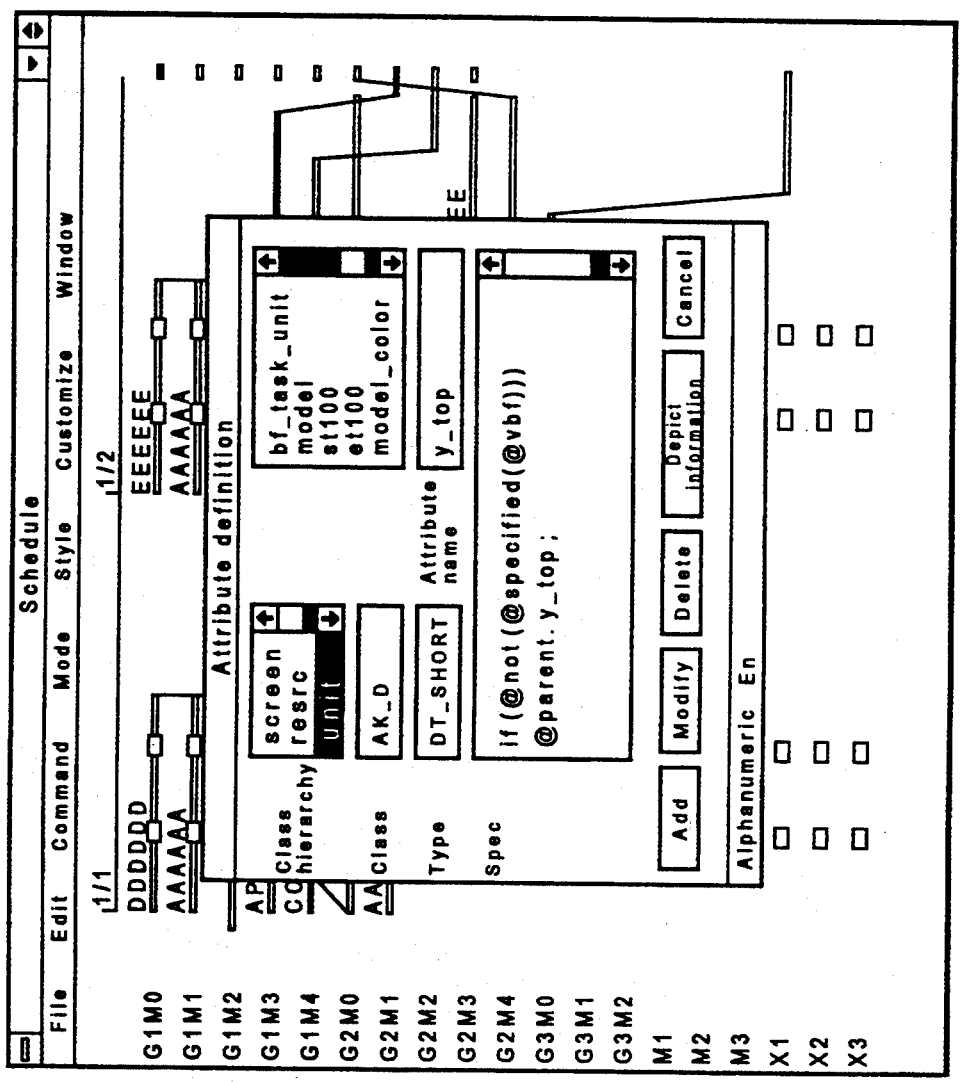
FIG. 10 shows a drawing of a screen example of the data object attribute modification window.

Step 2: The contents stored temporarily are displayed in their corresponding fields on the data object attribute modification window. (Screen example 2 in FIG. 10)

Step 3: The user makes modifications on this window.

If an attribute name in the list box at the upper right of the window is selected with the mouse, information concerning the corresponding attribute is temporarily stored, and its details are displayed in the respective fields.

If data is entered in each entry field and the Add, Modify, or Delete button is selected with the mouse, and attribute definition is added, modified, or deleted in the attribute definition storage device 8.

If the upward arrow button or the downward arrow button is selected with the mouse, the attribute definition of a superordinate or subordinate class is displayed correspondingly.

If an interactive device activation button is selected with the mouse, control is passed to a corresponding session of the interactive device 10.

Behavior of graphic object definition modifier 13

Step 1: The graphic object definition modifier 13 reads from the graphic object definition storage device 9 in the view storage device 6 a graphic object definition designated by an identifier stored temporarily in the graphic object definition retrieving device 4 and temporarily stores the graphic object definition. The class name of the class in which this definition is described and its definition serial number are then stored temporarily.

Figure 11:
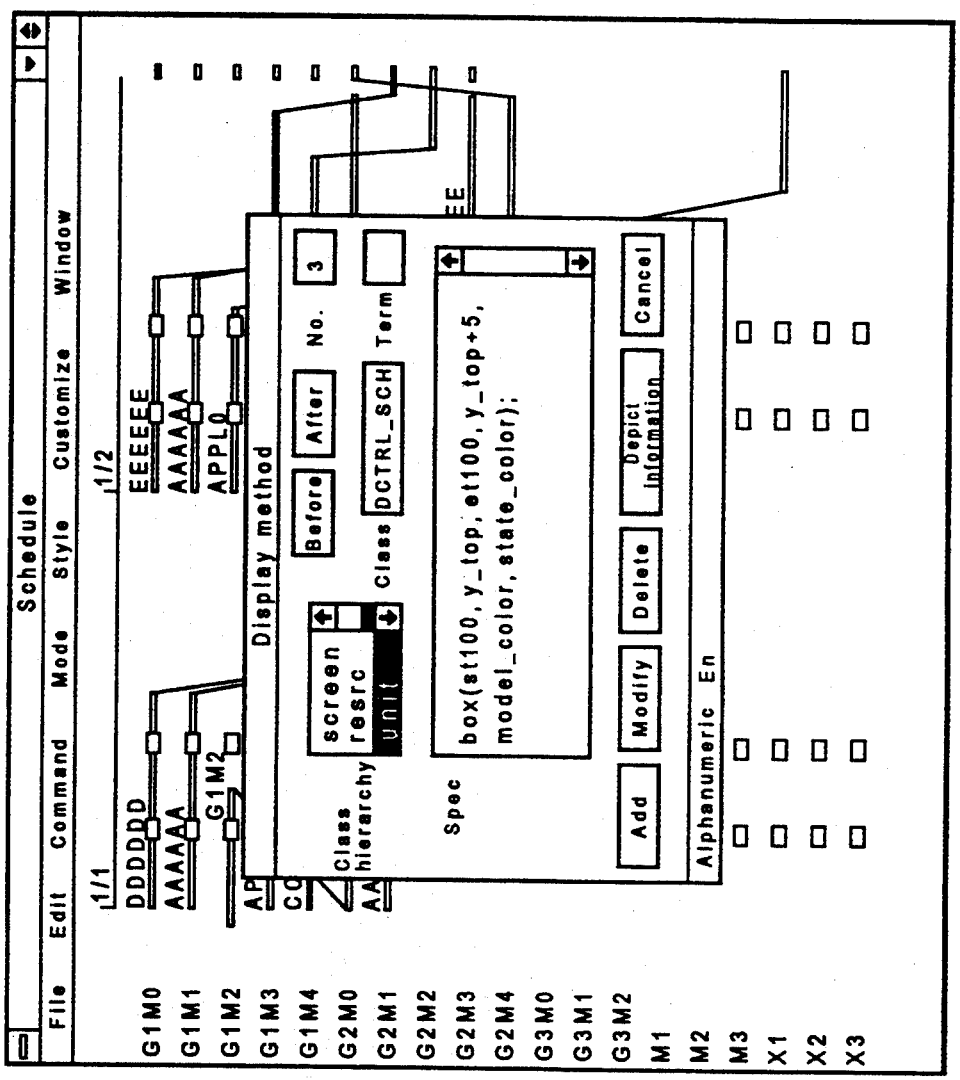
FIG. 11 shows a drawing of a screen example of the graphic object definition modification window.

Step 2: The contents stored temporarily are displayed respectively in their corresponding fields of the graphic object definition (display methods) modifying window. (Screen example 3 in FIG. 11)

Step 3: The user makes modifications on this window.

If data is entered in the graphic object definition field and the Add or Modify button is selected with the mouse by the user, a graphic object definition is added or modified correspondingly in the graphic object definition storage device 9.

If the Delete button is selected with the mouse, the graphic object definition entered in the graphic object definition field is deleted.

If the BEFORE or AFTER button is selected with the mouse, a preceding or a following graphic object definition on a given list of graphic object definitions arranged in order of serial number is displayed when there are two or more graphic object definitions.

If the upward arrow or downward arrow button is selected with the mouse, graphic object definitions subsumed in the upper or lower class are displayed.

If an interactive device activation button is selected with the mouse, control is passed to its corresponding session of the interactive device 10.

How to modify view:

A modification in a user's view is made by the group generating/deleting device 15 in the class layer structure modifier 14. If a user is to add a new class layer, he is requested to designate a class name and attribute names and to start the group generation session of the group generating/deleting device 15. To delete a class layer, designate a class name and start the group deletion session of the group generating/deleting device 15.

Figure 12:
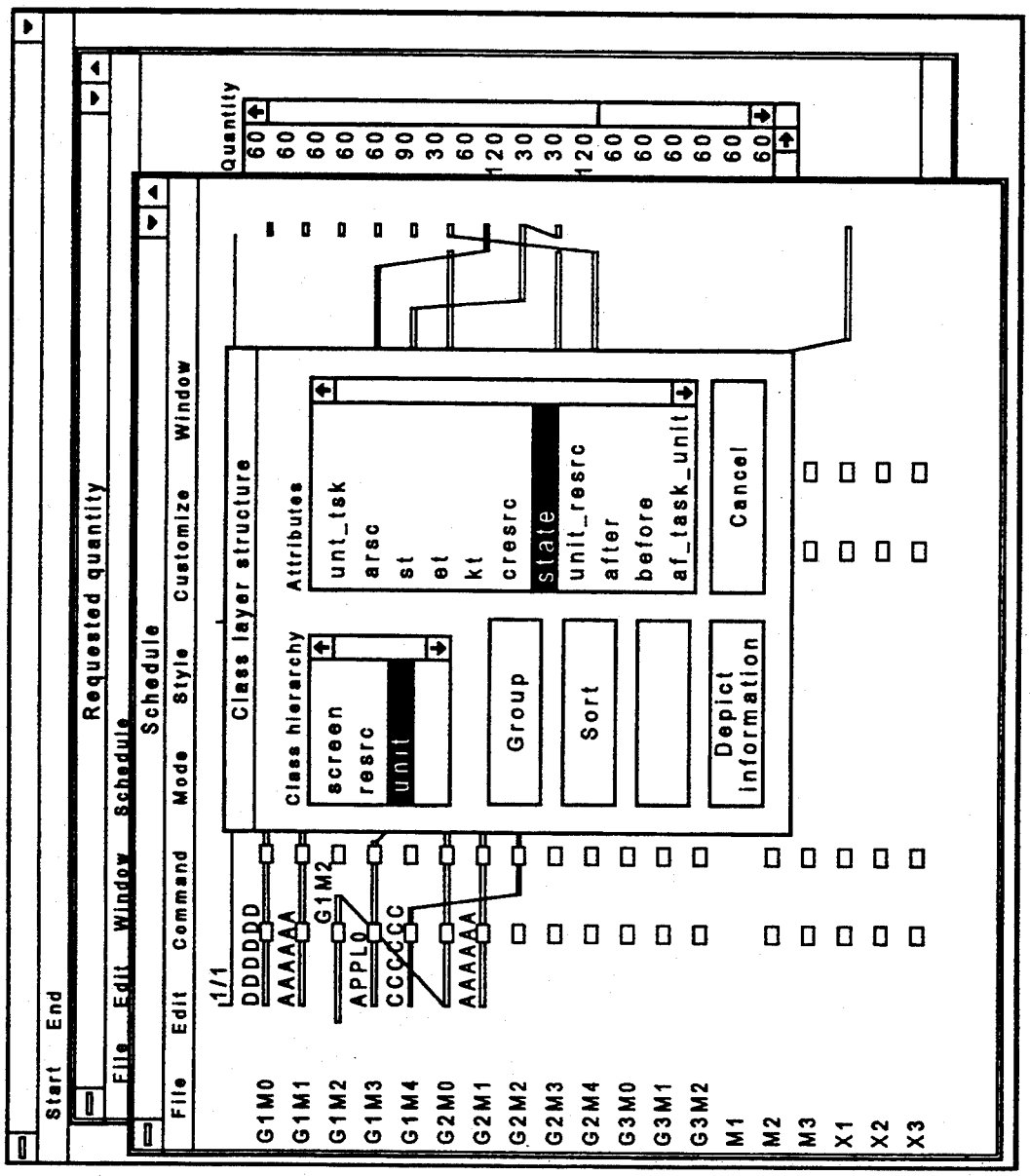
FIG. 12 shows a drawing of a screen example of the class layer structure modification window.

Behavior of class layer structure modifier 14:

Step 1: If the class layer structure modifier 14 is started, the modifier 14 loads a class layer from the class layer structure storage device 7 and displays it on the class layer structure display field of the class layer structure modifying window. (Screen example 4 in FIG. 12) Moreover, the lowermost class name in the class layer structure is stored temporarily.

Step 2: If a class in the class layer structure is designated by the user, the class name of the class is stored temporarily.

Step 3: If the group deletion button is selected with the mouse, the group deletion session of the group generating/deleting device 15 is started.

Step 4: If the group generation button is selected with the mouse, the group generation session of the group generating/deleting device is started.

Step 5: If the sort button is selected with the mouse, the sorting device is started.

Behavior of group deletion session of group generating/deleting device 15

Step 1: If the group deletion session is started, the device 15 deletes a data object in the data object storage device 5 that can be traced back through the given subsumptive links from a class name stored temporarily in the class layer structure storage device 7, and then joins the subobjects and originating object of the data object thus deleted together to constitute parentage links.

Step 2: The above mentioned class is deleted from the class layer structure storage device 7 and the list box, and the class name of its subordinate class is stored temporarily.

Behavior of group generation session of group generating/deleting device 15

Step 1: If the group generation session is started, the attribute names of attributes selected by a user from a given list of attribute names (displayed in the center of screen example 4 in FIG. 12) are stored temporarily.

Step 2: The superordinate class of the class thus stored temporarily is read from the class layer structure storage device 7.

Step 3: One Object subsumed in the superordinate class is fetched from the data object storage device 5. The object thus fetched is named object T.

Step 4: All subobjects subsumed under the originating object T are fetched from the data object storage device 5.

Step 5: The objects fetched at step 4 are classified into groups according to the attribute values of attributes stored temporarily.

Step 6: New data objects are produced for each group generated at step 5, and parentage links subsumed under each newly produced originating object are established between the objects classified into groups and the newly produced objects. Moreover, parentage links are established between the newly produced objects and the object T. At the same time, the older parentage is deleted.

Step 7: Steps 3 to 6 are repeated until the data objects are exhausted.

Behavior of sorting device 16

Step 1: If the sorting device 16 is started, it displays a list of the class attributes stored temporarily in the class layer structure modifier 14, and temporarily stores attributes selected by a user from the list in the class layer structure modifier 14.

Step 2: The data objects subsumed in the above mentioned class are rearranged in order of the above-mentioned attribute values.

Behavior of interactive device 10

The following describes the types and functions of windows to be displayed on the screen when each session of the interactive device 10:

Graphic object information display window (screen example 1 in FIG. 9)
  Displays graphic object instances (upper field of window)
  Displays graphic object definitions (lower field of window)

Data object attribute modification window (screen example 2 in FIG. 10)
  Displays the attribute names, class, and type of schedule data and a method of attribute value calculation (each field)
  Changes the class and type of each attribute and the method of attribute value calculation (MODIFY button)
  Adds or deletes attributes (ADD/DELETE button)

Graphic object definition modification window (screen example 3 in FIG. 11)
  Display, adds, deletes, or modifies graphic object definitions (ADD/DELETE/MODIFY button)

Class layer structure modification window (screen example 4 in FIG. 12)
  Displays the class layer structure of schedule data (class layer structure display field)
  Modifies the class layer structure by the group generating/deleting device (GROUP GENERATE/DELETE button)
  Changes the sequence of schedule data in a class by the sorting device 16 (SORT button)

(4) EXAMPLE OF CUSTOMIZATION

The following exemplifies the customization from the schedule display in FIG. 4 to the schedule display in FIG. 17:

Explanation of the Display in FIG. 4

Figure 13:
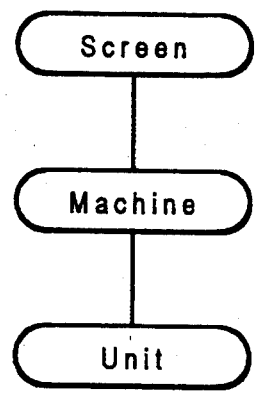
FIG. 13 shows a drawing of a user's view corresponding to the display in FIG. 4.

FIG. 4 shows an example of a display on a screen of schedules sorted by product name according to a user's view. FIG. 13 shows a user's view corresponding to the display in FIG. 2, where the screen, processing machine, and unit are class names.

Figure 14:
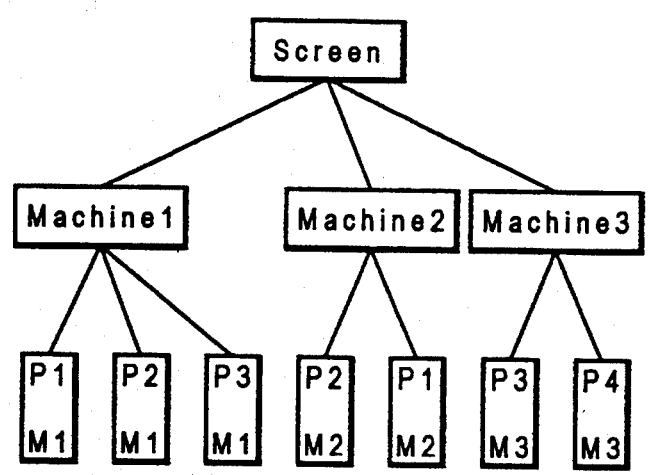
FIG. 14 shows a drawing of the structure of data objects corresponding to the display in FIG. 4.

FIG. 14 shows the structure of data objects corresponding to the display in FIG. 4.

In order to display schedules on a screen according to a user's view, or a class hierarchy, it is necessary to provide the required graphic object definitions for each class declaratively in a graphic object definition descriptive language. FIG. 7 shows an example of a group of graphic object definitions described in the unit class shown in FIG. 4. In FIG. 7, the graphic primitives "draw_line and draw_str" represent that a line segment and a character string be depicted on the screen The "start_time", "end_time" and "product_name" are attribute names referring to a processing start time, a processing end time, and a product name, respectively. The "y_act" is an attribute name indicating the position (height) of a depiction. By providing these graphic object definitions, the line segment and the product name above the segment in FIG. 4 are depicted on the screen.

Display of Schedules

On starting the schedule display, a data object is first read from the data object storage device. For example, suppose that the unit data object (P1, M1) is read. The graphic object definition for the data object is then read from its corresponding class in the graphic object definition storage device 9. Inasmuch as, in this case, the corresponding graphic object definitions are necessarily read from the unit class, one of those definitions may be the graphic object definition, for example in FIG. 7. Those graphic object definitions are then analyzed, and the values of the attributes referred to in those definitions are read from the data object storage device 5 through the attribute definition storage device. In this example, the values of the attributes "start_time", "end_time", "y_act", and "product_name" are read.

If a particular attribute referred to in a graphic object definition does not exist in the data objects of the class in which the graphic object definition is described, the originating data object of the data object in question is retrieved. If, for example, the attribute under reference is not found in the data object (P1, M1), the data objects of Machine 1 and Screen are retrieved in sequence.

Finally, a graphic object is produced from the above-mentioned input and is assigned a unique identification number before being transferred to the mouse-interlocked display screen 1. In this example, a line segment graphic object is generated in correspondence to each given line segment, which is displayed on the screen. All the graphic objects required for a schedule display are produced by repeating these operations on all the data objects in the data object storage device 5.

Storing in Correspondence Table Storage Device 3

The correspondence table storage device 3 stores the correspondence between the line segments drawn in the aforementioned procedure in FIG. 4 and the graphic object definitions in FIG. 7 in sets of three arguments: (graphic object identification number, graphic object instance, graphic object definition identifier). The graphic object instance is a string such that concrete values are bound to the variables of a graphic object definition; e.g.: with a line segment, its corresponding graphic object definition is "draw_line (start_time, y_act, end_time, y_act)": and the corresponding graphic object instance is the character string "draw_line (35,30,56,30):, as shown in FIG. 20.

User's Pointing to Graphic Objects with Mouse

When a user points to a graphic object with the mouse, the mouse-interlocked display screen returns its corresponding graphic object identification number. The graphic object definition retrieving device 4 searches the correspondence table in the correspondence table storage device 3 for the graphic object identification number to obtain a corresponding graphic object instance and a graphic object definition identifier. These are stored temporarily in the graphic object definition retrieving device 4.

Figure 20:
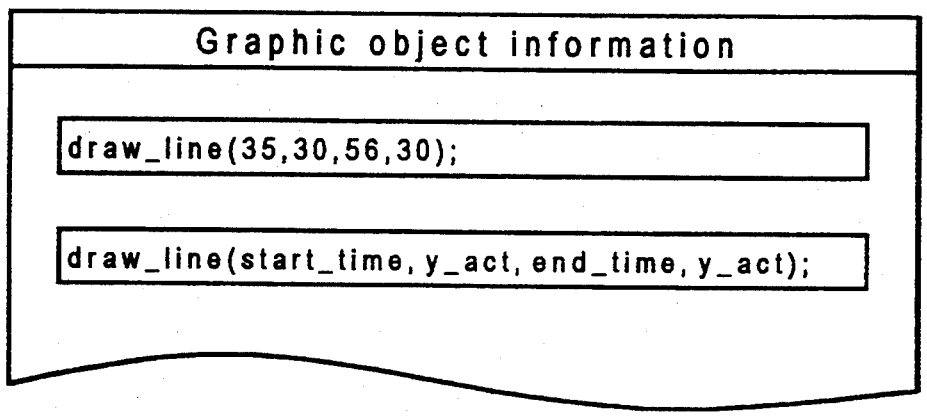
FIG. 20 shows a drawing of the display format of the graphic object information display window.

Then the graphic object information display 11 is started to display on the screen such a graphic object information display window as shown in FIG. 20 and certain graphic object definitions corresponding to the graphic object pointed.

Modification in Class Layer Structure

Figure 21:
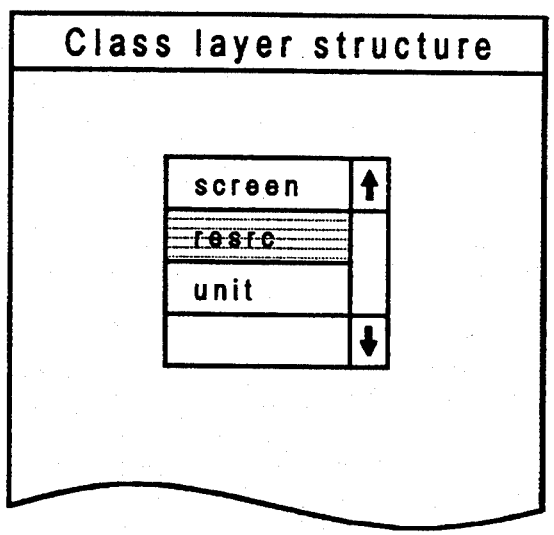
FIG. 21 shows a drawing of the display format of the class layer structure modification window.
Figure 22:
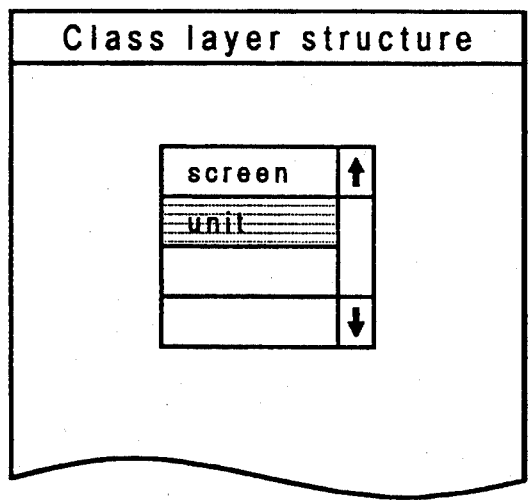
FIG. 22 shows a drawing of the display format of the class layer structure modification window.

If the user presses the class layer structure button then, the class layer structure modification window is displayed, as shown in FIG. 21. On the class layer structure modification window, the current class layer structure is displayed in the list box. This class layer structure corresponds to FIG. 13. Also, the structure of data objects is as shown in FIG. 14. If the user then selects the processing machine class and presses the GROUP DELETE button, the group deletion session is started, so that the processing machine class is deleted and the class layer structure is transformed as shown in FIG. 15. Thus the display in the list box changes to that shown in FIG. 22. The corresponding structure of the data object is as shown in FIG. 16.

Figure 18:
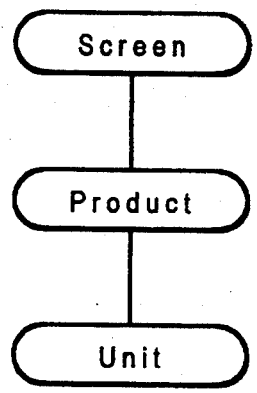
FIG. 18 shows a drawing of the hierarchical structure of classes corresponding to the display in FIG. 17.
Figure 23:
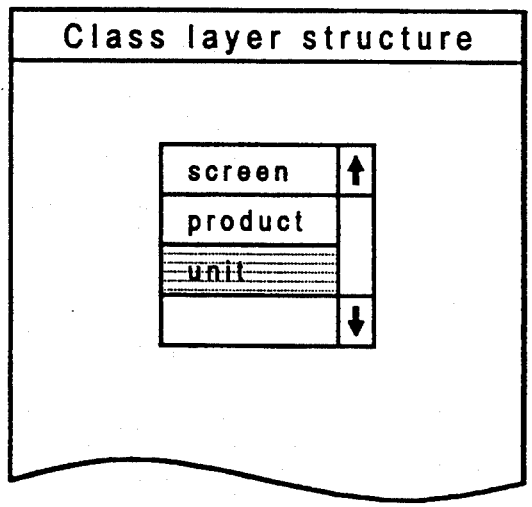
FIG. 23 shows a drawing of the display format of the class layer structure modification window.

If the user selects the unit class in the list box and presses the GROUP GENERATE button in order to classify unit data objects, a list of the attribute names of the unit class is displayed. If the user selects the attribute name "product_name" and presses the LINE FEED (LF) button, the group/ungroup device 15 classified the unit data objects by the product name attribute and provides a class hierarchical structure as shown in FIG. 18. The representation in the list box becomes as shown in FIG. 23.

If the user selects the product name class and presses the sort button, the sorting device 16 is started and provides a list of attribute names for the product class. When the user presses the LINE FEED (LF) button after selecting the product name, the product name data objects as subordinate data objects of the screen data object are rearranged in order of names.

Figure 19:
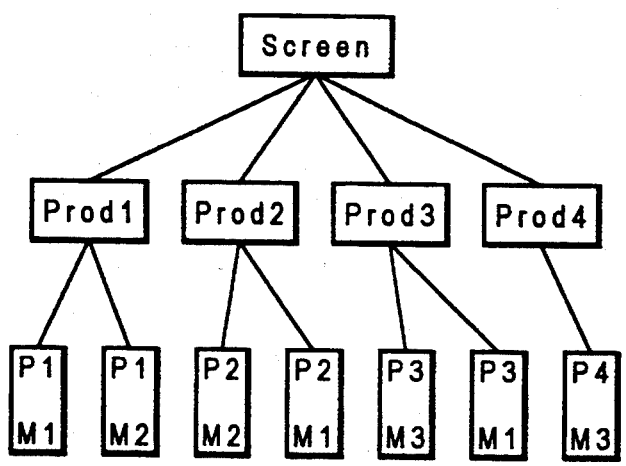
FIG. 19 shows a drawing of the structure of data objects corresponding to the display in FIG. 17.

FIG. 19 shows the final data object structure obtained through the series of operations described so far.

Graphic Object Definition Modification

Figure 24:
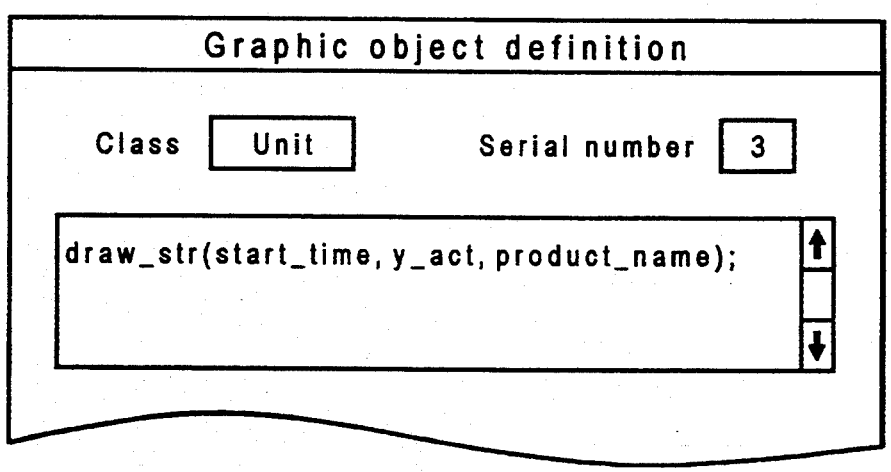
FIG. 24 shows a drawing of the display format of the graphic object definition modification window.

The final operation for changing the display in FIG. 4 to the display in FIG. 17 is to change the product names (P1, etc.) displayed over the line segments indicating unit data objects to machine names (M1, etc.). If the character string graphic objects such as P1 are designated while the graphic object information display window is on display, the graphic object instances and graphic object definitions for those graphic objects are displayed as well. If the display method button is then pressed, the graphic object definition modification window is displayed, as shown in FIG. 24. If the MODIFY button is pressed after the "product_name" argument of the graphic object definition shown in FIG. 7 is changed to "resource_name", then the graphic object definition is modified, so that the customization from FIG. 4 to FIG. 17 is completed.

Although the customizing apparatus in the embodiment described above consists of some functional blocks, these functional blocks may be constituted by hardware or software. To constitute them by software, the OS/2 (trademark) may be installed as OS on PS/55 (trademark) hardware by IBM to constitute the customizing apparatus as an application to run on the OS.

Upon reference to the foregoing, it will be appreciated that the applicants have provided a novel and useful apparatus and method for customizing a schedule display. While the invention has been particularly shown and described with reference to a preferred embodiment, it will be understood that various changes in form and detail may be made therein without departing from the spirit and scope of the invention.

We claim:

1. An apparatus for customizing a schedule display comprising:
   process unit storage means for storing information concerning attributes of one or more process units and information concerning grouping status of said process units;
   display attribute storage means for storing information defining one or more attributes to be displayed for each layer of grouping;
   display method storage means for storing information defining a way in which to display said attributes to be displayed for each layer of said grouping;
   means for modifying information concerning said grouping status of said process units stored in said process unit storage means;
   means for modifying the information stored in said display attribute storage means;
   means for modifying the information stored in said display method storage means; and
   means for displaying graphic representations of said process units on a screen according to said information stored in said process unit storage means, said display attribute storage means, and said display method storage means.

2. An apparatus for customizing a schedule display as set forth in claim 1 further comprising:
   layer storage means for storing information defining said layers of said grouping;
   means for modifying said information stored in said layer storage means; and
   means for correcting the information concerning said grouping status of process units stored in said process unit storage means according to the information stored in said layer storage means.

3. An apparatus for customizing a schedule display as set forth in claim 2 wherein the contents in said process unit storage means are generated according to schedule information from a schedule generator and information stored in said layer storage means.

4. An apparatus for customizing a schedule display as set forth in claim 3 wherein a hierarchical structure of said grouping is a tree structure in which the uppermost layer is a screen, and the lowermost layer is said process units.

5. An apparatus for customizing a schedule display set forth in claim 4, comprising means for sorting lower nodes and said process units into a sorting order for each upper node of said tree structure.

6. An apparatus for customizing a schedule display as set forth in claim 5, wherein said display method is defined so that display positions on said screen depend on said sorting order.

7. An apparatus for customizing a schedule display as set forth in claim 2 wherein a hierarchical structure of said grouping is a tree structure in which the uppermost layer is a screen, and the lowermost layer is said process units.

8. An apparatus for customizing a schedule display as set forth in claim 7, comprising means for sorting lower nodes and said process units into a sorting order for each upper node of said tree structure.

9. An apparatus for customizing a schedule display as set forth in claim 8 wherein said display method is defined so that display positions on said screen depend on said sorting order.

10. The apparatus for customizing a schedule display of claim 1, wherein said means for modifying information concerning said grouping status comprises:
 means for displaying a window requesting user input; and
 means, responsive to said user input, for modifying said grouping status of said process units as specified by said user input.

11. An apparatus for customizing a schedule display comprising:
 data object storage means for storing information concerning a tree structure defining a grouping of process units, wherein a screen correspond to a root of said tree structure and process units correspond to leaves of said tree structure, and wherein data objects define nodes, said root and said leaves of said tree structure;
 layer storage means for storing information defining layers of said data objects;
 display attribute storage means for storing information defining attributes to be displayed for each of said layers of said data objects;
 display method storage means for storing information defining a way in which to display attributes to be displayed for each of said layers of said data objects;
 means for modifying said information stored in said layer storage means;
 means for modifying said tree structure information stored in said data object storage means according to said information stored in said layer storage means;
 means for modifying said information stored in said display attribute storage means;
 means for modifying said information stored in said display method storage means; and
 means for displaying graphic representations of said process units on a screen according to said information stored in said data object storage means, said display attribute storage means, and said display method storage means.

12. The apparatus for customizing a schedule display of claim 11, wherein said means for modifying said information stored in said layer storage means comprises:
 means for displaying a window requesting user input; and
 means, responsive to said user input, for modifying said information defining layers of said data objects as specified by said user input.

13. A scheduling apparatus comprising:
 display means;
 means for generating schedule information;
 layer storage means for storing information defining layers of grouping of process units;
 means for generating information concerning one or more attributes and information concerning grouping status of said process units according to said schedule information and information defining said grouping;
 process unit storage means for storing said information concerning said attributes of said process units and said information concerning said grouping status of said process units;
 display attribute storage means for each of said layers of said grouping for storing information defining attributes to be displayed;
 display method storage means for each of said layers of said grouping for storing information defining a way in which to display said attributes to be displayed;
 means for modifying said information stored in said layer storage means;
 means for modifying said information stored in said display attribute storage means;
 means for modifying said information stored in said display method storage means; and
 means for displaying graphic representations of said process units on said screen according to said information stored in said process unit storage means, said display attribute storage means, and said display method storage means.

14. The scheduling apparatus of claim 13, wherein said means for modifying said information stored in said layer storage means comprises:
 means for displaying a window requesting user input; and
 means, responsive to said user input, for modifying said information defining layers of grouping as specified by said user input.

15. A method for customizing a schedule display comprising the steps of:
 storing information concerning one or more attributes and information concerning grouping status of process units;
 storing for each layer of said grouping, information defining attributes to be displayed;
 storing for each layer of said grouping, information defining a way in which to display said attributes to be displayed;
 modifying said information concerning said grouping status of said process units;
 modifying said information defining said attributes to be displayed;
 modifying said information defining said way in which to display said attributes to be displayed; and
 displaying graphic representations of said process units on a screen according to said information concerning said attributes, said information concerning said grouping status of said process units, said information defining said attributes to be displayed, and said information defining said way in which to display said attributes to be displayed.

16. The method for customizing a schedule display of claim 15, wherein said step of modifying said information concerning said grouping status of said process units comprises the steps of:
 displaying a window within a display device requesting user input; and
 in response to said user input, modifying said grouping status of said process units as specified by said user input.

* * * * *